United States Patent [19]

Schleicher

[11] Patent Number: 5,439,207
[45] Date of Patent: Aug. 8, 1995

[54] CONVEYOR SYSTEM FOR METALLIC PLATES AND STRIPS

[75] Inventor: Hermann Schleicher, Rathsberg/Marloffstein, Germany

[73] Assignee: Hermann Schleicher GmbH & Co., Hessdorf, Germany

[21] Appl. No.: 200,270

[22] Filed: Feb. 23, 1994

[30] Foreign Application Priority Data

Feb. 23, 1993 [EP] European Pat. Off. ............ 93102775

[51] Int. Cl.⁶ .............................................. B65H 9/30
[52] U.S. Cl. ...................................... 271/193; 271/901
[58] Field of Search ...................... 271/193, 18.1, 18.2, 271/901; 209/904, 907; 198/619

[56] References Cited

U.S. PATENT DOCUMENTS

| | | | |
|---|---|---|---|
| 3,662,635 | 5/1972 | Yabuta | 271/901 X |
| 4,077,507 | 3/1978 | Boquet | 198/619 |

FOREIGN PATENT DOCUMENTS

| | | | |
|---|---|---|---|
| 0226434 | 10/1986 | Japan | 271/901 |
| 0122845 | 5/1989 | Japan | 271/193 |
| 0122846 | 5/1989 | Japan | 271/193 |
| 0133840 | 5/1989 | Japan | 271/193 |
| 0133841 | 5/1989 | Japan | 271/193 |

*Primary Examiner*—H. Grant Skaggs
*Assistant Examiner*—Carol L. Druzbick
*Attorney, Agent, or Firm*—Kenyon & Kenyon

[57] ABSTRACT

A conveyor system for plates of metallic, magnetic or non-magnetic material is disclosed, consisting of a linear motor stator and a first nozzle plate which is arranged on the active side of the linear motor and a second nozzle plate arranged surface-parallel thereto while leaving a gap for the passage of the plates therebetween. By means of the nozzles of the nozzle plates, air cushions can be produced within the gap for the positioning of the plates. The magnetic fields produced by the linear motor can be employed to propel metal plates along the conveyor system.

19 Claims, 3 Drawing Sheets

CONVEYOR SYSTEM FOR METALLIC PLATES AND STRIPS

BACKGROUND OF THE INVENTION

The throughput quantity of transverse systems (shears, stacking devices) and presses (loading systems, feed systems) is a strong function of the transport speed of the corresponding conveyor system. This is particularly true with regards to large transfer presses. The conveyor systems employed must be so constructed that damage to the sheet plates transported, which can be caused by such diverse factors as contact with transport rollers, limit stops or guide rails, is substantially avoided. In addition to the known, purely mechanical conveyor systems of the type having transport carriages, roller tables, belts, and rail-guided carriages, it is also known to construct a conveyor system employing magnetism as a motive force. In such a system, metallic plates consisting of magnetic material (i.e., if not actually magnetic, then at least susceptible to attraction via a magnetic field) are magnetically advanced through the conveyor system. The magnetic field of the stator of a linear motor advances the plates, which form the rotor of the linear motor. In this system, air nozzles are arranged behind and in front of the linear motor along the direction of conveyance.

The air emerging from the air nozzles produces an air cushion between linear motor (stator) and plate (rotor) that prevents the plate from contacting the linear motor. The plate is accordingly moved without contact with the stator part of the linear motor. Such a device is set forth in U.S. Pat. No. 4,077,507, the contents of which are incorporated herein by reference in their entirety. The above-mentioned device can achieve high transport speeds but has the disadvantage that, due to the arrangement of the air nozzles in front of and behind the linear motor, the largest forces are exerted on the plates in the air nozzle region, so that undesired bending occurs approximately in the middle, at the linear motor. The properly positioned guidance is made extremely difficult due to the varying distribution of pressure in the air cushion; the proper coordination and positioning of the plate thus constitutes a source of considerable expense in the assembly operation. Particularly troublesome is the practical limitation that only the conveyance of thick plates (more than 7 mm) of magnetic material is possible. This disadvantage is all the more serious as the use of aluminum plates, e.g., of a non-magnetic metal in auto body manufacture, is of ever increasing importance.

There remains a need for a new conveyor system for metallic plates, be they magnetic or non-magnetic, which eliminates the above-mentioned disadvantages and assures conveyance of the plates that is mechanically substantially free of possibly harmful contact with the conveyor itself.

SUMMARY OF THE INVENTION

A first nozzle plate is arranged on the active side of each primary part (stator) of a linear motor, which is provided with several windings. Spaced across a gap and surface-parallel thereto is a second nozzle plate of non-metallic material which also helps create an air cushion. The first and second nozzle plates have nozzles which are open towards the gap. These nozzles are distributed over the surfaces of the plates, and can be connected to a source of compressed air via air lines inside the nozzle plates.

When using the conveyor system of the invention, the entire conveyor path, for instance from the stack-removal unit to the press, is subdivided into conveyor sections. Each conveyor section is provided with a linear motor and nozzle plates. In particular at the start of the conveyor path, two linear motors with nozzle plates can be arranged at an angle to each other. By means of information provided by proximity sensors, which detect the position of the individual plates, it is possible to change the excitation of the windings of the linear motors in such a manner that the plates assume a desired position. Upon a forking of the conveyor path as when, for instance, the latter is divided into three different branched-off conveyor paths, the cross-shaped arrangement of four linear motors with nozzles plates, in which each linear motor forms one arm of the cross, can provide directional control over the path of the plate. The position of the plate is in this case constantly monitored by the proximity sensors, which provide signals indicative of the position and/or orientation of the plate. The magnetic fields of the individual linear motors are then controlled as a function of the position so detected or of the locating signals via an electronic circuit so as to move the plate to a desired position. More general use may be made of proximity sensors as well. For example, proximity sensors can be provided along the entire conveyor path in each conveyor section, optionally in cooperation with timing members, so that the plates can be positioned, accelerated and decelerated via the magnetic fields of the linear motors. In addition, measurement rollers can also be provided.

BRIEF DESCRIPTION OF THE FIGURES

For a further explanation of the invention reference is made to the drawings, in which like elements are referenced by like numerals throughout.

DETAILED DESCRIPTION

Figure 1A:
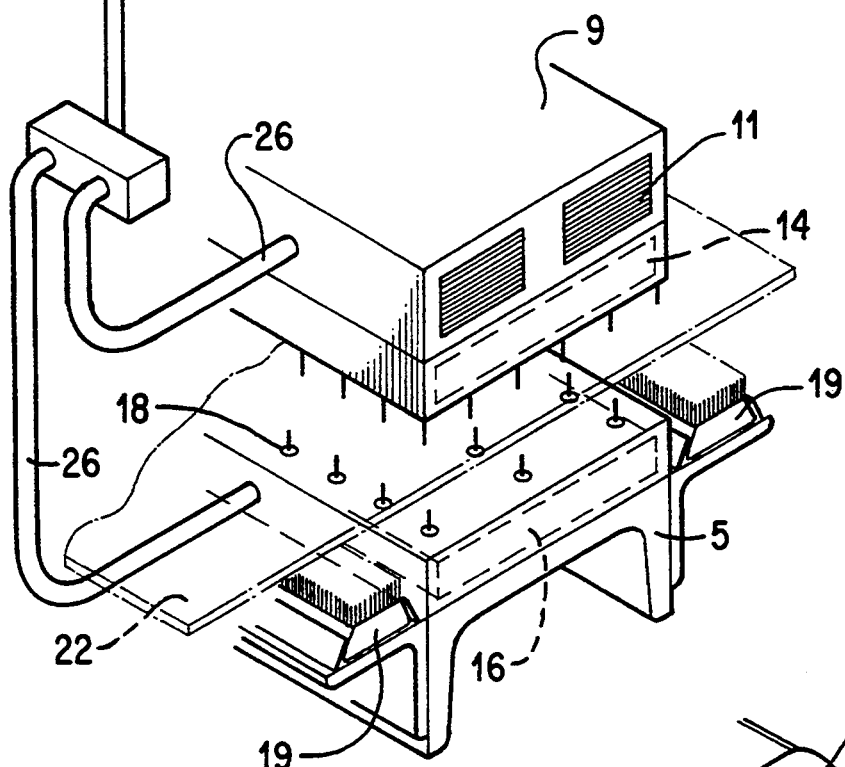
FIG. 1A schematically illustrates a perspective view of the basic design of a conveyor system constructed according to the principles of the invention.

FIG. 1A illustrates the primary elements of an embodiment of a conveyor system constructed according to the principles of the invention.

A linear motor having a stator 9 is provided in the form of an elongated parallelepiped block within which are arranged laminated cores having windings 11. The "rotor" function of the linear motor is carried out by a passing sheet or bar of suitable metal 22 (e.g., ferromagnetic steel) passing in proximity thereto. When electrical current flows through the windings 11, the windings 11 produce a magnetic force which longitudinally displaces the rotor (i.e., the metallic plate 22) at great speed, thanks to the component of the magnetic force that is aligned with the desired direction of motion. The other partial component of the magnetic force tends to attract the plate 22 of magnetic material to the linear motor (stator) 9. The degree to which these force vector components are generated by the magnetic field varies in dependence upon the magnetic nature of the material being transported.

In order to counter the effect of the component of the magnetic force directed towards the stator, which might cause the plate to strike the stator, an air dam is created. To this end, there are provided a pair of first and second non-magnetic nozzle plates 14 and 16. The first and second nozzle plates 14 and 16 are provided on their facing surfaces with nozzles 18 that are uniformly distributed over the entire facing surface of each plate. The nozzles 18 are connected via bore holes inside the first and second nozzle plates 14, 16, and air lines 26 to a source of compressed air 28.

The first nozzle plate 14 rests firmly on the lower active surface of the linear motor's stator 9. The nozzles 18 are, in this case, located on the side facing away from the linear motor. The first nozzle plate 14 can in this connection be developed in such a manner that it entirely or partially surrounds with its edges the parallelepiped of the linear motor's stator 9 so that the linear motor's stator 9 and the first nozzle plate 14 form one structural unit.

The second nozzle plate 16 is arranged surface-parallel to the first nozzle plate 14 so as to provide a gap therebetween. In the case of the second nozzle plate 16, the nozzles 18 point in the direction towards the linear motor stator 9. Otherwise, the second nozzle plate 16 is developed in the same manner as the first nozzle plate 14 and is also connected to a source of compressed air.

The height of the gap between the first and second nozzle plate 14 and 16 respectively is so selected that it is slightly larger than the thickness of the material of the plate 22 to be conveyed. Height adjustment devices of conventional structure (not shown) can be provided on the intermediate support 5 of the second nozzle plate 16 or on the linear motor's stator 9. Such adjustment devices enable one to adjust the height of the gap so that it is commensurate to the thickness of the plate 22 used.

Upon operation of the conveyor system with plates 22 of magnetic or ferromagnetic material, the first nozzle plate 14 is connected first to the source of compressed air. An air cushion develops between the plate 22 inserted into the gap and the first nozzle plate 14. This air cushion provides a level of pressure to compensate for the degree to which the plate 22 is attracted by the linear motor's stator, so that mechanical contact between the two is prevented. Thus, only that partial component of the magnetic force which can be used to cause the forward movement of the plate 22 remains to move the plate, and the plate 22 moves under its influence in the forward direction.

In the case of the conveyor system of the invention, the transport of the plate 22 is, over large areas, independent of its position. Slopes can be overcome without problems.

Where plates 22 of non-magnetic material are to be conveyed, an air cushion is produced via the second nozzle plate 16 between the latter and the plate 22, which keeps the plate at a predetermined distance from the linear motor stator 9. Also in this case there will thus be active only the partial component for the forward movement of the plate 22, should any exist, or a forward component of velocity or acceleration that may be geometrically provided by gravity or other motive force. The air cushions thus result in a floating of the plate 22, and conveyance of the plate again takes place free of contact with the nozzle plates.

Figure 1B:
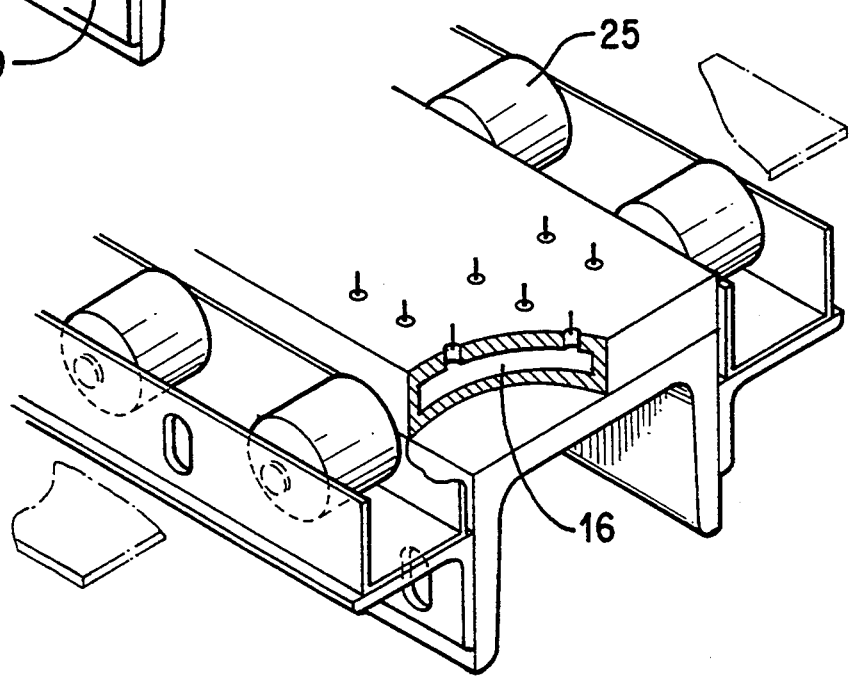
FIG. 1B shows a variant of the lower portion of the conveyor system shown in FIG. 1B.

As can further be noted from FIG. 1A, brush strips 19 are arranged to the right and left of the second nozzle plate 16 and, if required, also to the right and left of the first nozzle plate 14. These brush strips 19 are also provided with devices by which their height can be adjusted with respect to the corresponding surface of the first and second nozzle plate 14 and 16 respectively. In a further embodiment, illustrated in FIG. 1B, adjustable rollers 25 may be employed instead of the brush strips.

The brush strips 19 have several functions. On the one hand, they prevent damage to the surface of the plate 22 when the process commences and, on the other hand, they increase the directional stability provided by the system. They contribute also to the sealing off of the air cushion. It is advantageous, in particular, for the prevention of damage to the plate during the starting process but also in the case of malfunctioning of the system.

As a further feature, it is beneficial to make the nozzle plates 14, 16 of readily slidable, low coefficient of friction material, a property characteristic of certain plastics. By providing the nozzle plates with low-friction material on which plate 20 can readily slide even in the absence of one or both of the air cushion and magnetic field, the likelihood of damage to the-plate caused by unintentional collision between the plate and nozzle plates is reduced. Moreover, scratch marks are in this manner substantially avoided.

The uniform distribution of the nozzles over the surface of the first and second nozzle plates 14, 16 assures that no bending of the plate 22 takes place. When using plates of particularly small thickness, it may be advantageous to provide the nozzle plates 14 and 16 several connections to a source of compressed air in order to make the distribution of pressure over the entire surface of the nozzle plate more uniform. This may also be served by making the air resistances of the connections to the nozzles 18 more uniform.

Figure 2:
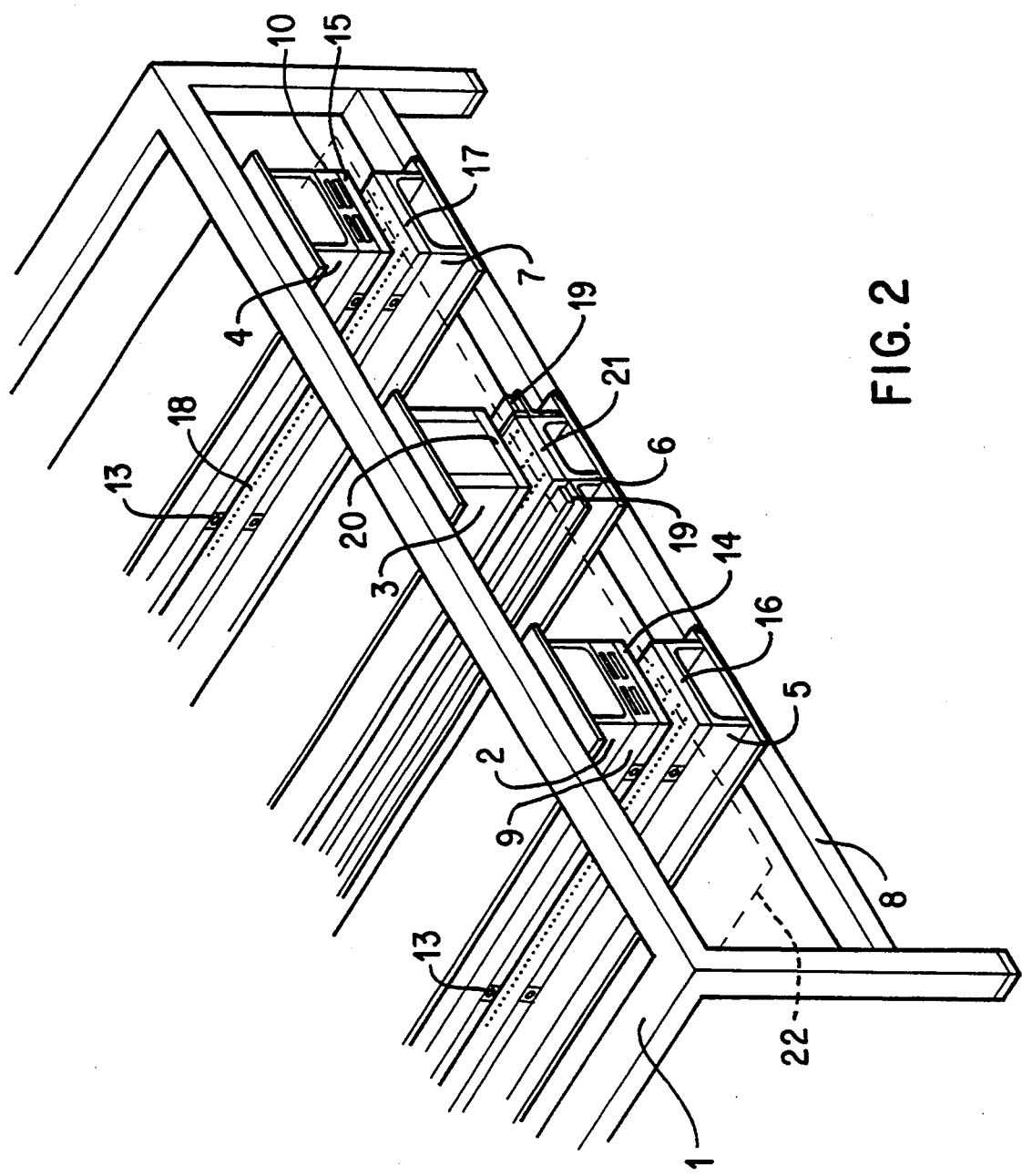
FIG. 2 is a perspective view further illustrating the operational arrangement of two parallel linear motors.

FIG. 2 illustrates one embodiment of a conveyor system preferred in practice for large transfer presses. Two linear motors 9, 10 are arranged in the supporting frame 1 parallel to and spaced from each other. The linear motors 9, 10 are, in this case, supported by the upper intermediate supports 2 and 4. The intermediate supports in their turn are attached to the supporting frame 1.

Since it is advantageous to configure the spacing between the linear motors 9, 10 to correspond to the spacing between the longitudinal edges of the plate 22 that is to be conveyed, it is useful to configure the transverse supports 2 and 4 so that their distance from each other can likewise be adjusted. The first nozzle plates 14, 15 and the second nozzle plates 16, 17 are arranged in a manner as described above with reference to FIG. 1A. The second nozzle plates 16, 17 are borne by the intermediate supports 5, 7 which in turn are attached to the transverse support 8 of the supporting frame 1. The intermediate supports, 5, 7 are adjustable with respect to their distance from each other in the same way as the linear motors 9, 10.

The reference numeral 13 designates proximity sensors which are adjustably attached along the path of conveyance. They may, for instance, be located on the first nozzle plates 14, 15. Several proximity sensors 13 can be employed to provide electrical signals, which, after processing in an electronic circuit, together can determine both the position of the plate with respect to a desired direction and with respect to its location. A variety of mechanisms can be employed for use as proximity sensors, including those that are light-dependent, utilize magnetic capacitive, or mechanical sensors such as measuring wheels or glass measuring sticks which give off their measured value as electrical signals.

In order to avoid the possible bending of the plate 22, auxiliary nozzle plates 20, 21 are arranged between the two conveyor systems with the linear motors 9, 10 to provide additional support. The auxiliary nozzle plates 20, 21 correspond in their structure to the nozzle plates 14, 15, 16 and 17. The first auxiliary nozzle plate 20 is attached to the supporting frame 1 via an intermediate support 3, the intermediate support 3 being sized to compensate for the height of the absent linear motor stator 9. The second auxiliary nozzle plate 21 is attached to the transverse support 8 via the intermediate support 6. In the same way as the nozzle plates 14, 15, 16 and 17, the first and second auxiliary nozzle plates 20, 21 are connected to a source of compressed air. Thus, an air cushion which positions the plate can be built up also between the first or second auxiliary nozzle plates 20 and 21 respectively and the plate.

The advantage of the conveyor system of FIG. 2 over the structural development of the conveyor system of FIG. 1 is based on the fact that the two linear motors 9, 10, which are arranged spaced from and parallel to each other, assure greater directional stability of the plates during their conveyance, and greatly facilitate the degree to which control can be exerted over the direction of conveyance of the plate 22. This can readily be accomplished by utilizing positional and/or other information computed in the electronic circuit to alter the magnet excitation of one or the other linear motors 9 and 10.

Figure 3:
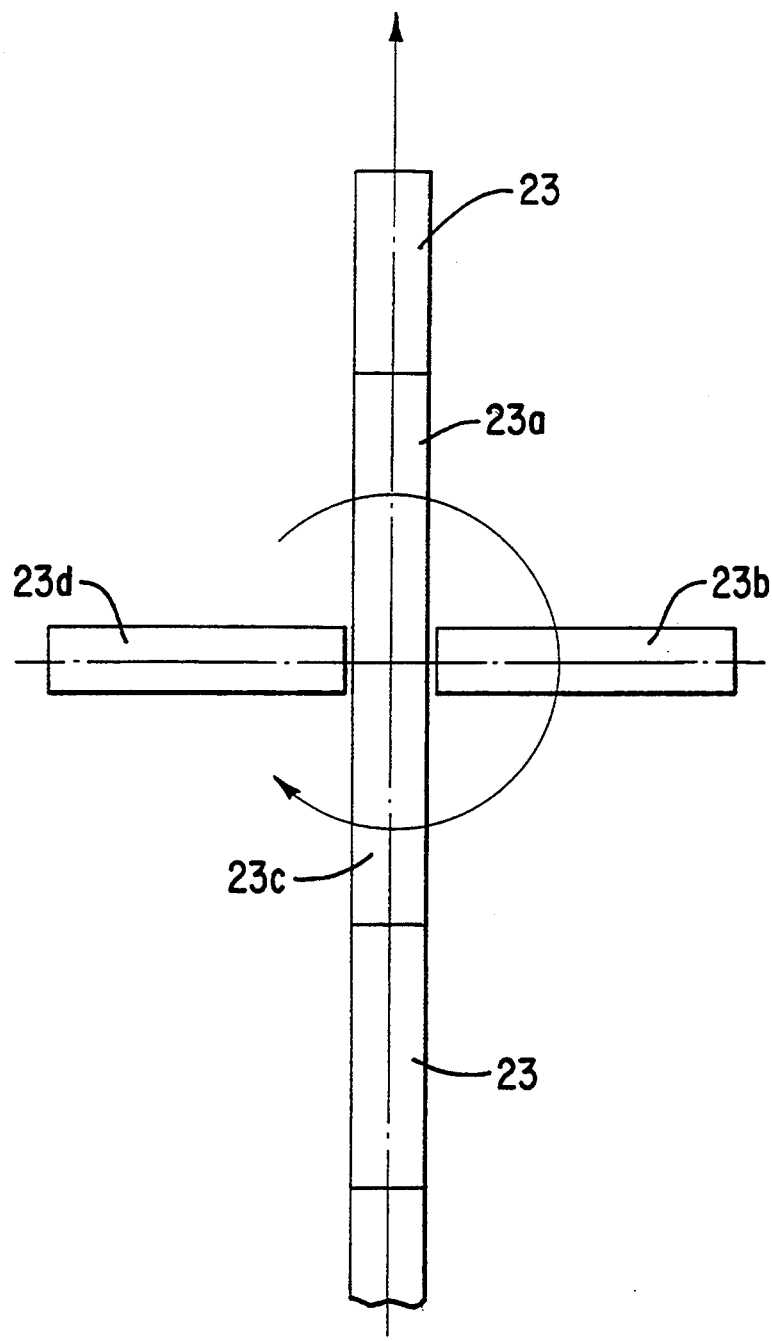
FIG. 3 illustrates the directional control afforded by a cross-shaped arrangement of four linear motors.

This is further set forth in FIG. 3, which shows the division of the conveyor path into conveyor sections 23. Each of these conveyor sections consists of conveyor systems such as shown in FIGS. 1 and 2. The conveyor sections 23(a), 23(b), 23(c) and 23(d) together form a positioning system. By means of a suitable electronic circuit, it is possible to change the magnetic fields of the individual linear motors 23(a) to 23(d) in such a manner that a plate 22 which is present in the cross of the conveyor systems can be made to rotate in its plane. Adjustment of the plate into a desired position is thus possible across a broad range of desired positions.

The positioning system for plates shown is suitable both to position plates before their entrance into the conveyor path as well as upon the exiting therefrom or into the press. It can furthermore be used for deflecting plates into conveyor paths which are branched off.

Further embodiments are comprehended by the invention. For example, where only magnetic plates are to be conveyed, it is within the scope of the invention to omit the second nozzle plates 16, 17. On the other hand, if only non-magnetic plates are to be conveyed, the first nozzle plates 14 and 15 may be dispensed with.

What is claimed is:

1. A conveyor system for metallic plates, comprising:
   at least one linear motor, said linear motor including a coil that serves as a stator;
   a first nozzle plate attached to the stator; and
   a second nozzle plate constructed of non-metallic material that is spaced apart from and parallel to the first nozzle plate, said spacing between the first and second nozzle plates defining a gap through which a plate may pass, said first and second nozzle plates having nozzles distributed over their facing surfaces towards the gap defined therebetween, said first and second nozzle plates further including air conduits located therein by which the nozzles can be connected to a source of compressed air, wherein at least one of the nozzle plates can be used to form an air cushion for controlling the distance between the stator and a plate, and wherein the plate forms the rotor of the linear motor when the plate is constructed of ferromagnetic material.

2. A conveyor system according to claim 1, further comprising adjustable brush strips located adjacent the longitudinal edges of the second nozzle plate.

3. A conveyor system according to claim 1, wherein the nozzle plates are provided with adjustable rollers.

4. A conveyor system according to claim 1, wherein the nozzle plates are made of plastic and one of the nozzle plates serves as the casing for the stator of the linear motor.

5. A conveyor system according to claim 1, wherein the nozzle plates are made of a low coefficient of friction, non-magnetic material.

6. A conveyor system according to claim 1, wherein the conveyor path is divided into conveyor sections and for each conveyor section there is provided at least one linear motor having nozzle plates.

7. A conveyor system according to claim 1, wherein for each individual conveyor section there are provided two linear motors that are arranged spaced from and parallel to each other as well as nozzle plates which can be adjusted so as to adapt them to the width of the plate that is to be transported through the conveyor system.

8. A conveyor system according to claim 7, wherein two auxiliary nozzle plates are located between the parallel linear motors having the nozzle plates.

9. A conveyor system according to claim 1, wherein at least two linear motors are arranged at an angle to each other so as to facilitate positioning of the plates.

10. A conveyor system according to claim 9, wherein four linear motors are arranged cross-wise to each other.

11. A conveyor system according to claim 1, further comprising proximity sensors for locating the plates, said proximity sensors providing control signals for electrically controlling the linear motors.

12. A conveyor system for transporting ferromagnetic material, comprising:
    at least one electromagnet for generating a magnetic field;
    a first nozzle plate attached to the electromagnet;
    a second nozzle plate constructed of non-metallic material that is spaced apart from and parallel to the first nozzle plate, said spacing between the first and second nozzle plates defining a gap through which ferromagnetic material may pass, said first and second nozzle plates have nozzles distributed over their facing surfaces towards the gap defined therebetween; and
    a source of compressed gas connected to the nozzles of the nozzle plates,
    wherein the flow of gas through at least one of the nozzle plates can be used to form an air cushion for controlling the distance between the electromagnet and the ferromagnetic material.

13. A conveyor system according to claim 12, further comprising brush strips located adjacent the edges of at least one nozzle plate, said brush strips serving to help contain a region of space having a level of air pressure that is different from its surroundings.

14. A conveyor system according to claim 12, wherein the nozzle plates are made of non-ferromagnetic material and one of the nozzle plates serves as the casing for the electromagnet.

15. A conveyor system according to claim 12, wherein the nozzle plates are made of a low coefficient of friction, non-magnetic material.

16. A conveyor system according to claim 12, wherein the conveyor system further comprises:
   a plurality of conveyor sections, each of which is provided with at least one magnetic field-strength adjustable electromagnet and a facing nozzle plate;
   at least one sensor for locating the position of the plate;
   means for adjusting the strength of the magnetic field of the electromagnets in the conveyor system so as to adjust the position of the plate along the conveyor system.

17. A conveyor system according to claim 12, further comprising a plurality of electromagnets and facing nozzle plates, at least some of which can be positionally adjusted with respect to one another.

18. A method for conveying ferromagnetic plates or strips along a conveyor path having solid pans, comprising the steps of:
   attracting the ferromagnetic plate towards an electromagnet overlying the ferromagnetic plate;
   preventing the ferromagnetic plate from contacting the electromagnet by applying a countervailing level of air pressure from a nozzle disposed at a position facing directly beneath the electromagnet so as to push the ferromagnetic plate away from the electromagnet, wherein the result of the application of air pressure and the electromagnet is to maintain the ferromagnetic plate at a level where it generally does not contact the solid parts of the conveyer.

19. A method according to claim 18, further comprising the steps of:
   sensing the position of the ferromagnetic plate;
   actuating at least one of a series of electromagnets in dependence upon the sensed position of the ferromagnetic plate so as to create an aggregate magnetic field to manipulate the velocity of the ferromagnetic plate.

* * * * *

UNITED STATES PATENT AND TRADEMARK OFFICE
CERTIFICATE OF CORRECTION

PATENT NO. : 5,439,207
DATED : AUGUST 8, 1995
INVENTOR(S) : SCHLEICHER

It is certified that error appears in the above-indentified patent and that said Letters Patent is hereby corrected as shown below:

In column 8, line 2, change "pans" to --parts,--.

Signed and Sealed this

Sixteenth Day of April, 1996

Attest:

BRUCE LEHMAN

Attesting Officer

Commissioner of Patents and Trademarks